US010913852B2

(12) United States Patent
Okamura et al.

(10) Patent No.: US 10,913,852 B2
(45) Date of Patent: Feb. 9, 2021

(54) SILOXAZANE COMPOUND AND COMPOSITION COMPRISING THE SAME, AND METHOD FOR PRODUCING SILCEOUS FILM USING THE SAME

(71) Applicant: Ridgefield Acquisition, Luxembourg (LU)

(72) Inventors: Toshiya Okamura, Kakegawa (JP); Naotaka Nakadan, Kakegawa (JP); Bertram Barnickel, Darmstadt (DE); Rikio Kozaki, Kakegawa (JP); Naoko Nakamoto, Kakegawa (JP)

(73) Assignee: Merck Patent GmbH, Darmstadt (DE)

( * ) Notice: Subject to any disclaimer, the term of this patent is extended or adjusted under 35 U.S.C. 154(b) by 79 days.

(21) Appl. No.: 16/462,803

(22) PCT Filed: Nov. 21, 2017

(86) PCT No.: PCT/EP2017/079861
§ 371 (c)(1),
(2) Date: May 21, 2019

(87) PCT Pub. No.: WO2018/095887
PCT Pub. Date: May 31, 2018

(65) Prior Publication Data
US 2019/0300713 A1    Oct. 3, 2019

(30) Foreign Application Priority Data
Nov. 24, 2016    (JP) .................................. 2016-228237

(51) Int. Cl.
C08L 83/14    (2006.01)
C08G 77/54    (2006.01)
C09D 183/14    (2006.01)

(52) U.S. Cl.
CPC .............. *C08L 83/14* (2013.01); *C08G 77/54* (2013.01); *C09D 183/14* (2013.01)

(58) Field of Classification Search
None
See application file for complete search history.

(56) References Cited

U.S. PATENT DOCUMENTS 4,869,858 A    9/1989  Funayama et al.
5,166,104 A    11/1992 Funayama et al.
(Continued)

FOREIGN PATENT DOCUMENTS

JP    H0618885 B2    3/1994
JP    3916272 B2    5/2007

OTHER PUBLICATIONS

International Preliminary Report on Patentability for PCT/EP2017/079861 dated Feb. 14, 2018.

*Primary Examiner* — Robert S Loewe
(74) *Attorney, Agent, or Firm* — Faegre Drinker Biddle & Reath LLP

(57) ABSTRACT

To provide a siloxazane compound capable of shortening the time of a siliceous film producing process and a composition comprising the same. A siloxazane compound having a specific structure, wherein the ratio of the number of O atoms to the total number of O atoms and N atoms is 5% or more and 25% or less, and in the spectrum of the siloxazane compound obtained by $^{29}$Si-NMR in accordance with the inverse gate decoupling method, the ratio of the area of the peak detected in −75 ppm to −90 ppm is 4.0% or less to the area of the peak detected in −25 ppm to −55 ppm; and a composition comprising the same.

17 Claims, 3 Drawing Sheets

(56) References Cited

U.S. PATENT DOCUMENTS

| | | | |
|---|---|---|---|
| 6,011,167 A | 1/2000 | Tashiro et al. | |
| 2012/0164382 A1 | 6/2012 | Yun et al. | |
| 2013/0337274 A1* | 12/2013 | Ozaki | B05D 5/06 |
| | | | 428/447 |
| 2014/0106576 A1* | 4/2014 | Morita | H01L 21/02282 |
| | | | 438/787 |
| 2015/0252222 A1* | 9/2015 | Ozaki | C08J 7/0427 |
| | | | 524/588 |
| 2015/0274980 A1* | 10/2015 | Yun | B05D 3/0433 |
| | | | 438/787 |
| 2016/0379817 A1* | 12/2016 | Okamura | C01B 21/087 |
| | | | 438/781 |

* cited by examiner

SILOXAZANE COMPOUND AND COMPOSITION COMPRISING THE SAME, AND METHOD FOR PRODUCING SILCEOUS FILM USING THE SAME

CROSS-REFERENCE TO RELATED APPLICATIONS

This application is a national stage application (under 35 U.S.C. § 371) of PCT/EP2017/079861, filed Nov. 21, 2017, which claims benefit of Japanese Application No. 2016-228237, filed Nov. 24, 2016, both of which are incorporated herein by reference in their entirety.

BACKGROUND OF THE INVENTION

Technical Field

The present invention relates to a siloxazane compound capable of producing a siliceous film with few defects in the process of manufacturing a semiconductor device or the like, and a composition comprising the same. The present invention also relates to a method for producing the siliceous film using the same.

Background Art

In the manufacture of electronic devices, especially semiconductor devices, an interlayer dielectric film is sometimes formed between a transistor element and a bit line, between a bit line and a capacitor, between a capacitor and a metal wiring and between plural metal wirings, etc. Further, an insulating material is filled in an isolation trench provided on a substrate surface or the like. Furthermore, after manufacturing a semiconductor device on a substrate surface, a coating layer is formed using an encapsulation material to form a package. Such an interlayer dielectric film or coating layer is often formed of a siliceous material.

On the other hand, in the field of electronic devices, the device rule has been gradually miniaturized, and the size of an insulating structure for separating each element which is incorporated in the device, is also required to be miniaturized. However, with the miniaturization of the insulating structure, number of defects in a siliceous film constituting a trench and the like has been increasing, and problem is increasing on decline in the yield of the electronic device.

On the other hand, as a method for producing the siliceous film, a chemical vapor deposition method (CVD method), a sol-gel method, a method for coating and baking a composition comprising a silicon-containing polymer, and the like are used. Among them, a method for producing a siliceous film using a composition is often adopted, since it is relatively simple. In order to produce such a siliceous film, a composition comprising a silicon-containing polymer such as polysilazane, polysiloxane, polysiloxazane, or polysilane is coated on a substrate surface or the like and then baked, whereby silicon that is contained in the polymer is oxidized to form a siliceous film.

Various developments have been made also on polysiloxazane having siloxane bonds introduced into the side chains of the polysilazane main chain. For example, Patent Documents 1 and 2 disclose a method for crosslinking Si atoms in polysilazane with trifunctional siloxane bond in order to increase its molecular weight.

PRIOR ART DOCUMENTS

Patent Documents

[Patent Document 1] JP-B No. 1897366
[Patent Document 2] JP-B No. 3916272

SUMMARY OF THE INVENTION

Problems to be Solved by the Invention

Generally, when a siliceous film is produced from a composition comprising polysiloxazane having a high oxygen content, a uniform film can be obtained in a shorter time. However, even though the oxygen content is high, the siliceous film tends to be ununiform if there are many crosslinkings due to trifunctional siloxane bonds. In consideration of such problems, development of an inorganic polysiloxazane compound, into whose main chain more oxygens, i.e. siloxane bonds, are introduced, and which can shorten the conversion time to the siliceous film particularly when thick film is produced while obtaining a uniform siliceous film, or a composition comprising the same has been desired. The inventors of the present invention have found that a specific oxygen content in a siloxazane compound and the presence or absence of a specific peak in the quantitative spectrum obtained by measuring $^{29}$Si-NMR in accordance with the inverse gate decoupling method affect the characteristics of the siloxazane compound.

Means for Solving the Problems

The siloxazane compound according to the present invention is a siloxazane compound having repeating units represented by the following general formulae (I) and (II)

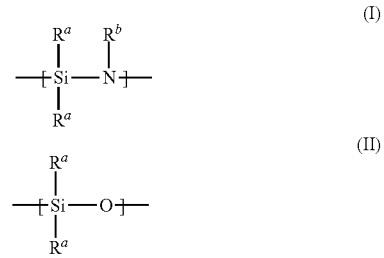

wherein $R^a$ and $R^b$ each independently represent a hydrogen atom, an alkyl group, an alkenyl group, a cycloalkyl group, or an aryl group, provided that at least one of the two $R^a$ bonded to one Si atom is a hydrogen atom, in the siloxazane compound, the ratio of the number of O atoms to the total number of O atoms and N atoms is 5% or more and 25% or less, and in the spectrum of the siloxazane compound obtained by $^{29}$Si-NMR in accordance with the inverse gate decoupling method, the ratio of the area of the peak detected in −75 ppm to −90 ppm to the area of the peak detected in −25 ppm to −55 ppm is 4.0% or less.

Further, the method for producing the compound according to the present invention comprises reacting a perhydropolysilazane with water in the presence of an amine.

The composition according to the present invention comprises the above-mentioned siloxazane compound and a solvent.

The method for producing a siliceous film according to the present invention comprises coating the above-mentioned composition on a substrate and heating it.

The method for manufacturing an electronic device according to the present invention comprises coating the above-mentioned composition on a substrate and heating it.

Effects of the Invention

Since the siloxazane compound according to the present invention has high stability against oxidation and permeation of steam into a film can be remarkably increased when the film is produced using the composition comprising the siloxazane compound, resulting in the time of a siliceous film producing process can be shortened.

DETAILED DESCRIPTION OF THE INVENTION

Mode for Carrying Out the Invention

Figure 1:
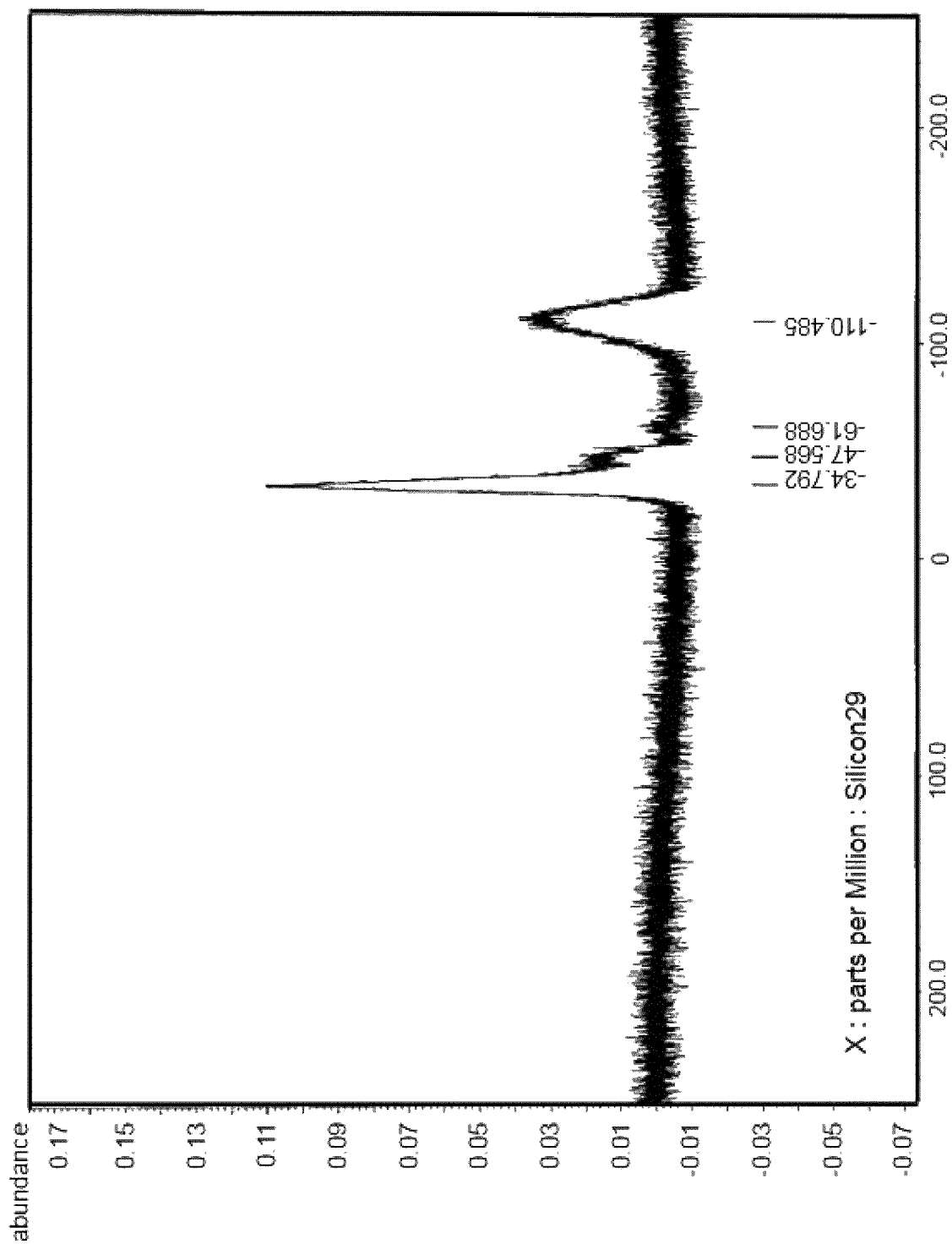
FIG. 1 is a spectrum obtained by measuring $^{29}$Si-NMR for a siloxazane compound according to one embodiment of the present invention.

Embodiments of the present invention are described below in detail.
[Siloxazane Compound]

The siloxazane compound according to the present invention is a siloxazane compound having repeating units represented by the following general formulae (I) and (II)

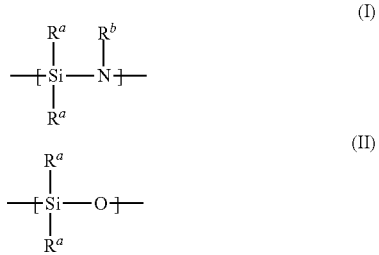

wherein $R^a$ and $R^b$ each independently represent a hydrogen atom, an alkyl group, an alkenyl group, a cycloalkyl group, or an aryl group, provided that at least one of the two $R^a$ bonded to one Si atom is a hydrogen atom, in the siloxazane compound, the ratio of the number of O atoms to the total number of O atoms and N atoms is 5% or more and 25% or less, and in the spectrum of the siloxazane compound obtained by $^{29}$Si-NMR in accordance with the inverse gate decoupling method, the ratio of the area of the peak detected in −75 ppm to −90 ppm to the area of the peak detected in −25 ppm to −55 ppm is 4.0% or less.

Preferable examples of $R^a$ include a hydrogen atom, an alkyl group having 1 to 3 carbon atoms, an aryl group having 6 to 10 carbon atoms, a vinyl group and a cycloalkane group having 6 to 10 carbon atoms, and more preferably, all $R^a$ are hydrogen atoms. Preferable examples of $R^b$ include a hydrogen atom, an alkyl group having 1 to 3 carbon atoms, an aryl group having 6 to 10 carbon atoms, a vinyl group having 2 to 8 carbon atoms and a cycloalkane group having 6 to 10 carbon atoms, and a hydrogen atom is more preferable.

Such a siloxazane compound has a branched structure or a cyclic structure in its molecule, and preferably, it mainly has a linear chain structure at the siloxane structure part and has a branched chain structure at the silazane structure part.

The siloxazane compound according to the present invention needs to have a specific molecular weight. In order to reduce the low molecular components dispersing (evaporating) and to prevent not only a volumetric shrinkage due to dispersing of the low molecular components but also a density reduction inside the fine trench when heating is carried out to convert the composition comprising the siloxazane compound according to the present invention to a siliceous substance. It is preferable that the mass average molecular weight of the siloxazane compound is large. In this respect, the mass average molecular weight of the siloxazane compound according to the present invention is required to be 1,500 or more, preferably 3,000 or more. On the other hand, when the siloxazane compound is dissolved in a solvent to form a composition, it is necessary to increase coatability of the composition. Specifically, it is necessary that the viscosity of the composition does not become excessively high and that the hardening rate of the composition is controlled to ensure penetration of the composition into the concavo-convex parts. In this respect, the mass average molecular weight of the siloxazane compound according to the present invention is required to be 52,000 or less, preferably 20,000 or less. Here, the mass average molecular weight means a mass average molecular weight in terms of polystyrene, which can be measured by the gel permeation chromatography.

Further, the siloxazane compound according to the present invention comprises O atoms and N atoms as atoms constituting the compound. Further, it is preferable that the ratio of the number of O atoms to the total number of O atoms and N atoms (hereinafter occasionally referred to as O/(O+N) ratio) is 5% or more and 25% or less. For example, this ratio can be measured as follows: First, the siloxazane compound is coated on a silicon wafer to produce a film with 600 nm in film thickness. The infrared absorption spectrum of this sample is measured by FT-IR and peak separation is performed by the curve fitting. A peak appearing around 1180 cm$^{-1}$ is assigned to Si—NH, one around 1025 cm$^{-1}$ is assigned to Si—O—Si, and one around 926 cm$^{-1}$ is assigned to Si—N—Si, respectively. Based on the ratio of their peak areas, O/(O+N) ratio can be obtained according to the calculation formula of (Si—O—Si)/[(Si—O—Si)+(Si—NH)+(Si—N—Si)]×100.

Further, the siloxazane compound according to the present invention is characterized by its molecular structure, and as compared with the generally known siloxazane compound, it is characterized by having mainly a linear chain structure and almost no branched chain structure at the siloxane structure part.

Such structural characteristics can be detected by the quantitative $^{29}$Si-NMR in accordance with the inverse gate decoupling method (in the present invention, simply referred to as "$^{29}$Si-NMR" in some cases). That is, the siloxazane compound according to the present invention exhibits specific characteristic values when evaluated by $^{29}$Si-NMR. $^{29}$Si-NMR is known as a method that can quantitatively obtain a NMR spectrum of $^{29}$Si and performs more accurate quantitative determination etc. of $^{29}$Si nuclei. Specifically, based on an assumption that the peak derived from a quartz NMR tube is −110 ppm, an analysis is performed by comparing the integrated value of the area of a peak detected at −75 ppm to −90 ppm to the area of a peak detected at −25 ppm to −55 ppm. One of the features of the siloxazane compound according to the present invention is that the integrated value ratio of the peak detected at −75 ppm to −90 ppm to the area of the peak detected at −25 ppm to −55 ppm in the siloxazane compound molecule is within a specific range when measured by $^{29}$Si-NMR using an NMR tube made of quartz.

In the present invention, measurement of $^{29}$Si-NMR can be specifically carried out as follows: First, the solvent is removed from the synthesized siloxazane compound with an evaporator, and 0.4 g of the obtained siloxazane is dissolved in 1.6 g of a deuterated solvent such as deuterochloroform (manufactured by Kanto Kagaku Co., Ltd.) to obtain a sample solution. The sample solution is measured 1,000 times using a nuclear magnetic resonance apparatus, JNM-ECS 400 type (trade name, manufactured by JEOL Ltd.) to obtain a $^{29}$Si-NMR spectrum. FIG. 1 is an example of NMR spectrum of the siloxazane compounds according to the present invention obtained by this method. In this NMR spectrum, a peak (δ=around −25 to −55 ppm) assigned to Si that is contained in a silazane structure (—N$_{1/2}$—Si—N$_{1/2}$—: the following formula (i)) and Si that is contained in a siloxazane structure (~N$_{1/2}$—Si—O$_{1/2}$—: the following formula (ii)) in the siloxazane compound; and a peak (δ=around −75 to −90 ppm) assigned to Si that is contained in the trifunctional siloxane structure (—Si(O$_{1/2}$—)$_3$: the following formula (iii)) are observed.

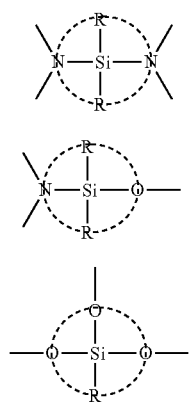

wherein, R represents hydrogen or a hydrocarbon group.

In the siloxazane compound according to the present invention, the smaller the peak assigned to Si that is contained in the trifunctional siloxane structure is, the stronger the effect of the present invention is provided, and the ring structure of 6 or more ring members tends to increase when the siliceous film is produced. Therefore, the ratio of the area of the peak assigned to the trifunctional siloxane bond (the peak detected at −75 ppm to −90 ppm) to the area of the peak detected at −25 ppm to −55 ppm (hereinafter, occasionally referred to as trifunctional siloxane peak intensity ratio) is preferably 4.0% or less, more preferably 3.0% or less, further preferably 2.0% or less.

The siloxazane compound having such a specific structure has a feature that steam easily permeates in the depth direction when it is cured under a steam atmosphere after producing a coating film on a substrate from a composition. The reason is considered to be that by introducing a siloxazane structure (the above formula (ii)), the film density becomes small, and as a result, the curing time can be shortened.

[Method for Producing Siloxazane Compound]

The siloxazane compound according to the present invention can be generally synthesized by forming a perhydropolysilazane and polycondensing the perhydropolysilazane in the presence of amine. In contrast to the conventional method, the siloxazane compound according to the present invention can be produced by controlling the water concentration, temperature, dropping rate and type of the amine of the aqueous amine solution to be added, and structure of the polymer to be hydrolyzed.

The method for producing the siloxazane compound according to the present invention is described more specifically as follows.

First, dichlorosilane as a raw material is reacted with ammonia in a solvent such as dichloromethane or benzene to form a perhydropolysilazane. If the molecular weight of the perhydropolysilazane is too large, the amount of oxygen to be introduced into the formed siloxazane tends to become low, so that the molecular weight of the perhydropolysilazane is preferred to be low.

Specifically, the molecular weight of the perhydropolysilazane is preferably 3,100 or less, more preferably 2,000 or less.

Subsequently, the siloxazane compound according to the present invention can be formed by heating the perhydropolysilazane, which is an intermediate product, and water in a solvent and subjecting to polycondensation reaction in the presence of an amine.

As the solvent, any solvent can be used as long as it does not decompose the perhydropolysilazane. Examples of the solvents, which can be used, include hydrocarbon solvents such as aliphatic hydrocarbons, alicyclic hydrocarbons and aromatic hydrocarbons; halogenated hydrocarbons such as halogenated methane, halogenated ethane and halogenated benzene; ethers such as aliphatic ethers and alicyclic ethers; and the like. Preferred solvents are halogenated hydrocarbons such as methylene chloride, chloroform, carbon tetrachloride, bromoform, ethylene chloride, ethylidene chloride, trichloroethane and tetrachloroethane; ethers such as ethyl ether, isopropyl ether, ethyl butyl ether, butyl ether, 1,2-dioxyethane, dioxane, dimethyl dioxane, tetrahydrofuran and tetrahydropyran; and hydrocarbons such as pentane, hexane, isohexane, methylpentane, heptane, isoheptane, octane, isooctane, cyclopentane, methylcyclopentane, cyclohexane, methylcyclohexane, benzene, toluene, xylene and ethylbenzene; and the like. As the amine to be added to the reaction system, tertiary amines are preferred, and aromatic amines such as pyridine are also preferred.

The polycondensation reaction of the present invention is generally carried out in the above-mentioned solvent, in which case concentration of the perhydropolysilazane is generally from 0.1 mass % to 50 mass %, preferably from 1 mass % to 12 mass %. When concentration of the perhydropolysilazane is lower than this range, the intermolecular polycondensation reaction does not proceed sufficiently. When concentration of the perhydropolysilazane is higher than this range, the intermolecular polycondensation reaction proceeds excessively to form a gel in some cases. The reaction temperature of the polymer solution is generally −10° C. to 60° C., preferably −5° C. to 30° C. At a temperature lower than this range, the polycondensation reaction does not proceed sufficiently during the reaction and the polycondensation reaction proceeds rapidly at the subsequent solvent substitution, so that controlling of the structure becomes difficult and it proceeds further to form a gel in some cases. Further, even at a temperature higher than this range, the polycondensation reaction proceeds excessively during the reaction, so that controlling of the structure becomes difficult and it proceeds further to form a gel in some cases. As the reaction atmosphere, atmospheric air can be used, but preferably, a reducing atmosphere such as a hydrogen atmosphere or an inert gas atmosphere such as dry nitrogen, dry argon and the like or a mixed atmosphere thereof is used. In the polycondensation reaction in the present invention, pressure is applied by hydrogen that is a by-product at the time of reaction; however, pressurization is not necessarily required and normal pressure can be adopted. In addition, the reaction time varies depending on various conditions such as type and concentration of the perhydropolysilazane, type and concentration of the basic compound or the basic solvent, and temperature of the polycondensation reaction; however, generally, the range of 0.5 hour to 40 hours is sufficient.

[Composition]

The composition according to the present invention comprises the above-mentioned siloxazane compound and a solvent. Examples of the solvent used for preparing this composition liquid include (a) aromatic compounds such as benzene, toluene, xylene, ethylbenzene, diethylbenzene, trimethylbenzene and triethylbenzene; (b) saturated hydrocarbon compounds such as cyclohexane, decahydronaphthalene, dipentene, n-pentane, i-pentane, n-hexane, i-hexane, n-heptane, i-heptane, n-octane, i-octane, n-nonane, i-nonane, n-decane, ethylcyclohexane, methylcyclohexane, cyclohexane and p-menthane; (c) unsaturated hydrocarbons such as cyclohexene; (d) ethers such as dipropyl ether, dibutyl ether and anisole; (e) esters such as n-butyl acetate, i-butyl acetate, n-amyl acetate and i-amyl acetate; (f) ketones such as methyl isobutyl ketone (MIBK); and the like, but not limited to these. Further, using plural kinds of solvents, it is also possible to adjust solubility of the siloxazane compound and evaporation rate of the solvent.

So as to improve the workability by the coating method to be adopted, and taking permeability of the solution into the fine trench and the film thickness required in the outside of the trench into consideration, the amount of the solvent in the composition is appropriately selected depending on the mass average molecular weight, distribution and structure of the siloxazane compound to be used.

The composition according to the present invention generally comprises 0.5 to 60 mass %, preferably 2 to 45 mass % of the siloxazane compound based on the total weight of the composition.

[Method for Producing Siliceous Film]

The method for producing a siliceous film according to the present invention comprises coating the above-mentioned composition on a substrate and heating it. The shape of the substrate is not particularly limited, and it can be optionally selected according to the purpose. However, the curing composition according to the present invention is characterized by being easily penetrated even into narrow trenches and the like and capable of producing a uniform siliceous film even in the inside of a trench, so that it is preferably applied to a substrate having trench portions and holes of a high aspect ratio. Specifically, it is preferably applied to a substrate having at least one trench having a width of the deepest portion of 0.2 μm or less and an aspect ratio of 2 or more. Shape of the trench is not particularly limited, and the cross section may be any of a rectangle, a forward tapered shape, a reverse tapered shape, a curved surface shape, and the like. Both end portions of the trench may be opened or closed.

According to the conventional method, even if it is attempted to fill the trench having a width of the deepest portion of 0.2 μm or less and an aspect ratio of 2 or more with a siliceous material, due to large volume shrinkage at the time of conversion to the siliceous material, the density inside of the trench becomes lower than outside of the trench and it was difficult to fill the trench with the material inside and outside of the trench homogeneously. On the other hand, according to the present invention, it is possible to obtain a homogeneous siliceous film inside and outside the trench. Such an effect of the present invention becomes more remarkable when a substrate having very fine trenches having a width of the deepest portion of 0.1 μm or less is used.

Typical examples of the substrate having at least one trench of a high aspect ratio include a substrate for an electronic device comprising a transistor element, a bit line, a capacitor, and the like. For the manufacture of such an electronic device, subsequent to a step of forming a dielectric film between a transistor element and a bit line called PMD, between a transistor element and a capacitor, between a bit line and a capacitor, or between a capacitor and a metal wiring, and a dielectric film between a plurality of metal wirings called IMD, or a step of filling an isolation trench, a through hole plating step of forming a hole vertically penetrating the filling material of the fine trench is included in some cases.

The present invention is suitable also for any other application where filling with a homogeneous siliceous material inside and outside the trench is required for a substrate with a high aspect ratio. Such applications include, for example, undercoat of glass for liquid crystal (passivation film for such as Na), overcoat of color filter for liquid crystal (insulating planarization film), gas barrier for film liquid crystal, hard coating of substrate (metal, glass), heat resistance and anti-oxidation coating, antifouling coating, water repellent coating, hydrophilic coating, ultraviolet-cutting coating for glass and plastics, and color coating.

The method for coating the curing composition to such a substrate is not particularly limited, and common coating methods such as a spin coating method, a dipping method, a spray method, a transfer method, and a slit coating method can be applied.

After coating the curing composition, a drying step is carried out under treatment conditions of in atmospheric air, inert gas or oxygen gas at a temperature of 50 to 400° C. for 10 seconds to 30 minutes for the purpose of drying or preliminary curing of the coating film.

The solvent is removed by drying, and the fine trenches are substantially filled with the siloxazane compound.

According to the present invention, the siloxazane compound existing inside and outside of the trench is converted to a siliceous material by curing. It is preferable to heat in an atmosphere containing steam during the curing.

The atmosphere containing steam means an atmosphere having a steam partial pressure within the range of 0.5 to 101 kPa, preferably 1 to 90 kPa, more preferably 1.5 to 80 kPa. Curing can be carried out in a temperature range of 300 to 1,200° C.

In addition, in case that other element such as an electronic device, which is simultaneously exposed to a heat treatment, is present and if curing is carried out in a steam-containing atmosphere at high temperature, for example, at temperature exceeding 600° C., there is a concern that the other element is adversely affected in some cases. In such a case, the silica conversion step is divided into two or more stages, and the heating can be carried out, first in a steam-containing atmosphere at relatively low temperature, for example, in the temperature range of 300 to 600° C. and then in a steam-free atmosphere at higher temperature, for example, in a temperature range of 500 to 1,200° C.

Any gas can be used as a component other than steam in an atmosphere containing steam (hereinafter referred to as dilution gas), and specific examples thereof include air, oxygen, nitrogen, helium, argon, and the like. It is preferable to use oxygen as the dilution gas in terms of the film quality of the obtained siliceous material. However, the dilution gas is appropriately selected in consideration of the influence on other elements such as electronic devices exposed to the heat treatment. Furthermore, a reduced pressure or a vacuum atmosphere of less than 1.0 kPa can be adopted as the steam-free atmosphere in the above-described two-stage curing condition, in addition to the atmosphere containing any of the above dilution gases.

Taking these circumstances into consideration, examples of suitable heating conditions are provided:

(1) coating the curing composition according to the present invention on a predetermined substrate, after drying, curing in an atmosphere at temperature in the range of 300 to 600° C. and a steam partial pressure in the range of 0.5 to 101 kPa, and subsequent annealing in an atmosphere of a temperature in the range of 400 to 1,200° C. and an oxygen partial pressure in the range of 0.5 to 101 kPa;

(2) coating the curing composition according to the present invention on a predetermined substrate, after drying, curing in an atmosphere at temperature in the range of 300 to 600° C. and a steam partial pressure in the range of 0.5 to 101 kPa, and subsequent annealing in an atmosphere of one or more inert gases selected from nitrogen, helium and argon at temperature in the range of 400 to 1,200° C.; and (3) coating the curing composition according to the present invention on a predetermined substrate, after drying, curing in an atmosphere at temperature in the range of 300 to 600° C. and a steam partial pressure in the range of 0.5 to 101 kPa, and subsequent annealing in a reduced pressure or vacuum atmosphere, which is less than 1.0 kPa, at temperature in the range of 400 to 1,200° C.

The heating rate and cooling rate to the target temperatures during heating is not particularly limited, but they can generally be set in the range of 1° C. to 100° C./min. Further, the heating and holding time after reaching the target temperature is also not particularly limited, but it can generally be set in the range of 1 minute to 10 hours.

By means of the above heating step, the siloxazane compound undergoes a hydrolysis reaction with steam to be converted into a siliceous material mainly composed of Si—O bonds. Since this conversion reaction also does not contain any decomposition of organic group, the volume change before and after the reaction is very small. Therefore, when a siliceous film is produced on the surface of a substrate having a trench of a high aspect ratio, it becomes homogeneous both inside and outside of the trench when using the curing composition according to the present invention. Further, according to the method of the present invention, since there is no conformal property like the CVD method, it can be uniformly filled inside the fine trenches. In addition, the densification of the siliceous film was insufficient according to the conventional method. But according to the method of the present invention, the densification of the film after the siliceous conversion is promoted and cracks are unlikely to occur. In addition, since the number of nitrogen atoms in the polymer is smaller than that of the polysilazane compound, the curing time for conversion into a uniform siliceous film can be shortened. This is advantageous especially when producing a thick siliceous film. Generally, the concentration of nitrogen atoms in the produced siliceous film is increased at a position depending on the depth from the surface. But according to the present invention, uniformity of the concentration of nitrogen atoms is increased in the depth direction.

In the method for producing a siliceous film according to the present invention, the thickness of the siliceous film produced on the substrate surface and the thickness of the coating film produced on the surface of the outer part of the trench are not particularly limited, and in general, they can be set to an optional thickness within a range that does not cause cracks in the film at the time of converting to the siliceous material. As described above, according to the method of the present invention, cracks are unlikely to occur even when the film thickness becomes 0.5 μm or more. Therefore, for example, with respect to a contact hole having a width of 1000 nm, a trench having a depth of 2.0 μm can be filled substantially without any defect.

The method for manufacturing an electronic device according to the present invention comprises coating the above-mentioned composition on a substrate and heating it.

Example

The present invention is described in more detail by use of Examples below.

Synthesis Example 1: Synthesis of Intermediate (A)

After replacing the inside of a 10 L reaction vessel equipped with a cooling condenser, a mechanical stirrer and a temperature control device, with dry nitrogen, 7,500 mL of dry pyridine was charged into the reaction vessel, which was cooled down to −3° C. Then, 500 g of dichlorosilane was added to form a solid state adduct of white color (SiH$_2$Cl$_2$.2C$_5$H$_5$N)). After confirming that the reaction mixture became −3° C. or lower, 350 g of ammonia was slowly blown into it while stirring. Subsequently, after continuing to stir for 30 minutes, dry nitrogen was blown into the liquid layer for 30 minutes to remove the excess ammonia. The resulting slurry product was subjected to pressure filtration under a dry nitrogen atmosphere using a 0.2 μm filter made of Teflon (registered trademark) to obtain 6,000 mL of filtrate. When pyridine was distilled off using an evaporator, a xylene solution of a perhydropolysilazane having a concentration of 42.1% was obtained. When the obtained perhydropolysilazane was analyzed by GPC (eluent: CHCl$_3$), the mass average molecular weight in terms of polystyrene was 1,401. The perhydropolysilazane obtained according to this process is hereinafter referred to as Intermediate (A).

Example 1

After replacing the inside of a 10 L reaction vessel equipped with a quantitative delivery liquid pump, a thermostatic chamber for amine aqueous solution, a cooling condenser, a mechanical stirrer and a temperature control device, with dry nitrogen, 4,959 g of dry pyridine and 450 g of Intermediate (A) obtained in Synthesis Example 1, which has a concentration of 42.1%, were charged and stirred while bubbling nitrogen gas at 0.5 NL/min so that they become homogeneous. After cooling to −3° C., 1,135 g of pyridine aqueous solution was slowly dropped thereinto. After the dropping, stirring was carried out for 30 minutes, and thereafter the siloxazane compound of Example 1 was obtained.

With respect to the obtained siloxazane compound, the ratio of the number of O atoms to the total number of O atoms and N atoms was measured. The siloxazane compound of Example 1 was coated on a silicon wafer to produce a film, and a sample having a film thickness of 600 nm was prepared. The infrared absorption spectrum of the obtained sample was measured by FT-IR and peak separation was performed by curve fitting. From the peak area ratio of the peak appearing around 1,180 cm$^{-1}$ (Si—NH), the peak appearing around 1,025 cm$^{-1}$ (Si—O—Si), and the peak appearing around 926 cm$^{-1}$ (Si—N—Si), the ratio of O atoms to the total number of O atoms and N atoms was measured in accordance with the calculation formula of (Si—O—Si)/[(Si—O—Si)+(Si—NH)+(Si—N—Si)]×100. Further, in the spectrum obtained by $^{29}$Si-NMR measurement of these siloxazane compounds, the ratio of the area of the peak detected at −75 ppm to −90 ppm to the area of the peak detected at −25 ppm to −55 ppm was calculated. As the result, with respect to the siloxazane of Example 1, the ratio of O atoms to the total number of O atoms and N atoms (O/(O+N) ratio) was 6.2%, and the ratio of the area of the peak detected at −75 ppm to −90 ppm to the area of the peak detected at −25 ppm to −55 ppm (trifunctional siloxane peak intensity ratio) was 0.

Examples 2 to 5 and Comparative Example 1

The procedure in Example 1 was repeated except for varying the amount of the aqueous solution to be added, and siloxazane compounds having different O/(O+N) ratios were synthesized.

Comparative Example 2

When the synthesis in Example 1 was carried out except for changing the addition amount of the aqueous solution to 3,594 g, the composition was finally gelated and, as the result, any siloxazane compound could not be obtained.

Comparative Examples 3 and 4

Intermediate (A) obtained in Synthesis Example 1 was dissolved in dibutyl ether to obtain a perhydropolysilazane of Comparative Example 3 having a mass average molecular weight of 1,401.

After replacing the inside of a 10 L reaction vessel equipped with a cooling condenser, a mechanical stirrer and a temperature control device, with dry nitrogen, 4,680 g of dry pyridine, 151 g of dry xylene and 1,546 g of Intermediate (A) obtained in Synthesis Example 1, which has a concentration of 42.1%, were charged and stirred while bubbling nitrogen gas at 0.5 NL/min so that they become homogeneous. Subsequently, the reforming reaction was carried out at 100° C. for 11.4 hours to obtain a perhydropolysilazane of Comparative Example 4 having a mass average molecular weight of 3,068.

Comparative Examples 5 to 7

After replacing the inside of a 10 L reaction vessel equipped with a cooling condenser, a mechanical stirrer and a temperature control device, with dry nitrogen, 7,500 g of dry pyridine was charged into the reaction vessel and it was cooled down to −3° C. Then, 142 g of dichlorosilane was added to form a solid state adduct of white color (SiH$_2$Cl$_2$.2C$_5$H$_5$N)). Subsequently, after cooling down to −10° C., 1,009 g of pyridine aqueous solution was slowly dropped. After confirming that the reaction mixture became −3° C. or lower, 427 g of ammonia was slowly blown into it while stirring. Subsequently, after continuing to stir for 30 minutes, dry nitrogen was blown into the liquid layer for 30 minutes to remove the excess ammonia. The resulting slurry product was subjected to pressure filtration under a dry nitrogen atmosphere using a 0.2 μm filter made of Teflon (registered trademark) to obtain 6,000 mL of filtrate. When pyridine was distilled off using an evaporator, a xylene solution of a perhydropolysilazane having a concentration of 20.0% was obtained. With respect to the obtained perhydropolysilazane, the mass average molecular weight was 1,526 and the O/(O+N) ratio was 4.9% (Comparative Example 5).

When the synthesis in Comparative Example 5 was carried out except for changing to 5,979 g of dry pyridine, 2,552 g of pyridine aqueous solution and 400 g of ammonia, a siloxazane compound having a different structure and O/(O+N) ratio of 10.8% was obtained (Comparative Example 6).

When the synthesis in Comparative Example 5 was carried out except for changing to 6,015 g of dry pyridine, 2,551.8 g of pyridine aqueous solution having two times concentration and 356 g of ammonia, the composition was finally gelated and, as the result, any siloxazane compound could not be obtained. (Comparative Example 7).

Comparative Examples 8 to 11

After replacing the inside of a 10 L reaction vessel equipped with a cooling condenser, a mechanical stirrer and a temperature control device, with dry nitrogen, 7,500 mL of dry dichloromethane was charged into the reaction vessel and it was cooled down to −3° C. Then, 341 g of dichlorosilane was added, and subsequently 173 g of ammonia and 1,261 g of tetrahydrofuran aqueous solution were simultaneously added for reaction. Subsequently, after cooling down to 0° C., and subsequently, after continuing to stir for 30 minutes, dry nitrogen was blown into the liquid layer for 30 minutes to remove the excess ammonia. The resulting slurry product was subjected to pressure filtration under a dry nitrogen atmosphere using a 0.2 μm filter made of Teflon (registered trademark) to obtain 8,000 mL of filtrate.

When pyridine was distilled off using an evaporator, a xylene solution of a perhydropolysilazane having a concentration of 20.0% was obtained. With respect to the obtained perhydropolysilazane, the mass average molecular weight was 3,069 and the O/(O+N) ratio was 9.5% (Comparative Example 8).

The procedure in Comparative Example 8 was repeated except for varying the amount of the tetrahydrofuran aqueous solution to be added, and the siloxazane compounds of Comparative Examples 9 to 11 were obtained.

Comparative Example 12

After replacing the inside of a 1 L reaction vessel equipped with a cooling condenser, a mechanical stirrer and a temperature control device, with dry nitrogen, 490 mL of dry pyridine was charged into the reaction vessel and it was cooled down to −3° C. Then, 51.9 g of dichlorosilane was added to form a solid state adduct of white color (SiH$_2$Cl$_2$.2C$_5$H$_5$N)). After confirming that the reaction mixture became −3° C. or lower, 51.0 g of ammonia was slowly blown into it while stirring. Subsequently, after continuing to stir for 30 minutes, dry nitrogen was blown into the liquid layer for 30 minutes to remove the excess ammonia. The resulting slurry product was heated at 100° C. for 1 hour and then subjected to pressure filtration under a dry nitrogen atmosphere using a 0.2 μm filter made of Teflon (registered trademark) to obtain 40 mL of filtrate. When pyridine was distilled off using an evaporator, a xylene solution of a perhydropolysilazane having a concentration of 23.0% was obtained. The mass average molecular weight of the obtained perhydropolysilazane was 1,158 (Comparative Example 12).

Comparative Example 13

After replacing the inside of a 300 mL reaction vessel equipped with a cooling condenser, a mechanical stirrer and a temperature control device, with dry nitrogen, 80 mL of dry xylene was charged into the reaction vessel, then 10 g of the polysilazane obtained in Comparative Example 12 and 10 g of triethylamine were charged and the content was cooled down to −3° C. 10.5 g of 4.7% triethylamine aqueous solution was dropped over 10 minutes. Subsequently, after continuing to stir for 30 minutes, and then pyridine was distilled off using an evaporator to obtain a xylene solution of siloxazane having a concentration of 18.9%. With respect to the obtained siloxazane, the mass average molecular weight was 7,544 and the O/(O+N) ratio was 14.8%.

Comparative Example 14

When the synthesis in Comparative Example 13 was repeated by replacing triethylamine with butylamine and adding 20.5 g of 2.4% butylamine aqueous solution, the composition was finally gelated and, as the result, it was difficult to handle.

Comparative Example 15

The synthesis in Comparative Example 13 was repeated by replacing triethylamine with pyridine. With respect to the obtained siloxazane, the mass average molecular weight was 2,872 and the O/(O+N) ratio was 11.2%.

The O/(O+N) ratio and the trifunctional siloxane peak intensity ratio of the siloxazane according to each Example were shown in Table 1.
[Table 1]

TABLE 1

|  | O/(O + N) ratio | trifunctional siloxane |
| --- | --- | --- |
| Example 1 | 6.2 | 0 |
| Example 2 | 8.4 | 0 |
| Example 3 | 9.5 | 0 |
| Example 4 | 15.5 | 1.76 |
| Example 5 | 20.7 | 3.51 |
| Comparative Example 1 | 1.6 | 0.22 |
| Comparative Example 2 | n/a | n/a |
| Comparative Example 3 | 0 | 0 |
| Comparative Example 4 | 0 | 0 |
| Comparative Example 5 | 4.9 | 9.52 |
| Comparative Example 6 | 10.8 | 23.26 |
| Comparative Example 7 | n/a | n/a |
| Comparative Example 8 | 9.5 | 10.41 |
| Comparative Example 9 | 17.9 | 16.3 |
| Comparative Example 10 | 23.4 | 44.21 |
| Comparative Example 11 | n/a | n/a |

TABLE 1-continued

|  | O/(O + N) ratio | trifunctional siloxane |
| --- | --- | --- |
| Comparative Example 12 | 0 | 0.412 |
| Comparative Example 13 | 14.8 | 6.04 |
| Comparative Example 14 | n/a | n/a |
| Comparative Example 15 | 11.2 | 4.57 |

In the table, n/a indicates that the composition was gelated and could not be measured.

Figure 2:
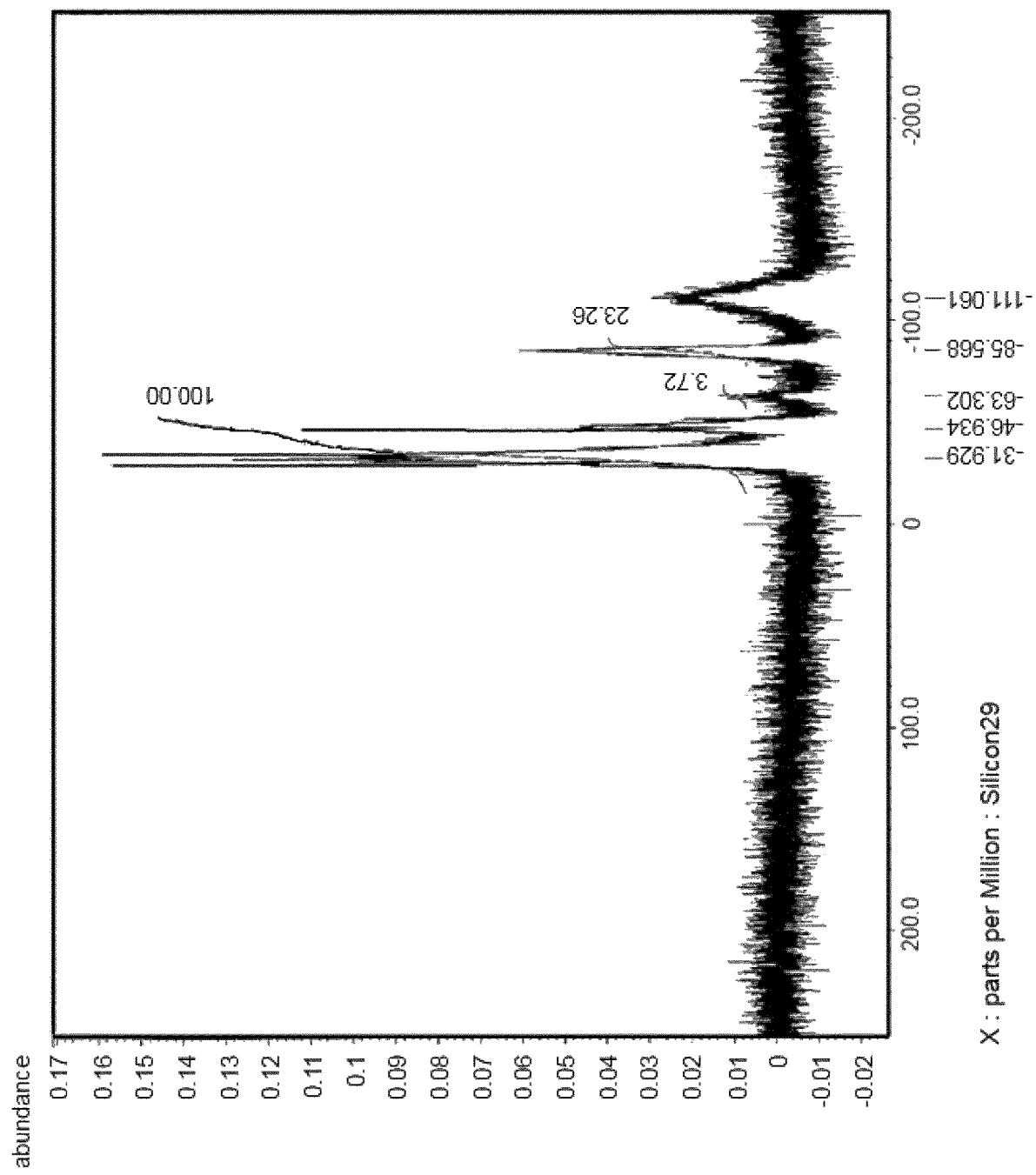
FIG. 2 is a spectrum obtained by measuring $^{29}$Si-NMR for a siloxazane compound of a Comparative Example.

FIG. 1 is a typical spectrum obtained by measuring $^{29}$Si-NMR for a siloxazane compound which is one embodiment of the present invention, and FIG. 2 is a typical spectrum obtained by measuring $^{29}$Si-NMR for a siloxazane compound of a Comparative Example. A peak at −75 ppm to −90 ppm is observed in FIG. 2, but not observed in FIG. 1.

Respective compositions were prepared by adding xylene to the siloxazane compound of Example 3 and the siloxazane compound of Comparative Example 4 to adjust the concentration so as to get a coating film thickness of 600 nm. Using a spin coater (Spin Coater 1HDX2 (trade name) manufactured by Mikasa Co., Ltd.), each composition obtained was spin-coated on a 4 inch wafer at 1,000 rpm. Using the obtained coating film as a sample, the nitrogen content was analyzed by secondary ion mass spectrometry (SIMS).

The SIMS measurement was carried out under the following conditions.

After a siloxazane solution was coated to a substrate to obtain a film having a thickness of 600 nm, the film was cured in an 80% steam atmosphere of 350° C. for 120 minutes and then under a nitrogen atmosphere of 850° C. for 60 minutes to obtain a siliceous film. Nitrogen content in the obtained film was analyzed using a SIMS instrument, PHI ADEPT1010, under the conditions of primary ion Cs$^+$ and primary acceleration voltage of 5.0 kV.

Figure 3:
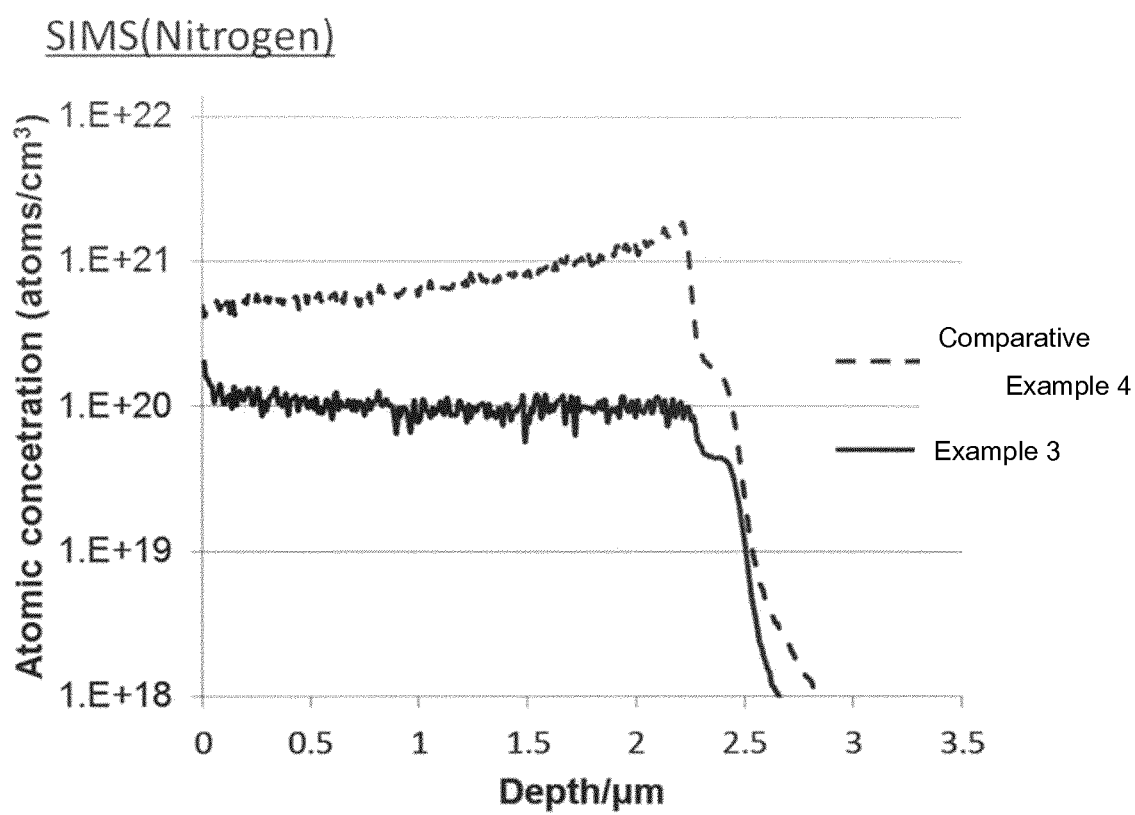
FIG. 3 is a figure showing distribution of nitrogen atoms in accordance with the secondary ion mass spectrometry in an Example and a Comparative Example.

The obtained results are shown in FIG. 3. From these results, it is observed that in the siliceous film obtained from the composition comprising the siloxazane compound according to the present invention, the concentration of nitrogen atom hardly varies in the depth direction. But in the siliceous film obtained from the composition comprising the polysilazane compound, the concentration of nitrogen atom increases depending on the depth. This indicates that when the siloxazane compound according to the present invention is used, the heating time for oxidation to form a uniform siliceous film can be shortened.

[Composition Evaluation of Film Formed in Trench]

A coating composition was prepared by adjusting the concentration of each siloxazane compound so as to produce a coating film of about 600 nm. The prepared coating composition was filtered with a filter made of PTFE having a filtration accuracy of 0.02 μm. The coating composition after filtration was coated on a silicon wafer at 1,000 rpm using a spin coater (Mark 8, manufactured by Tokyo Electron Limited). This wafer has a trench with a depth of 500 nm and a width of 100 nm, which shape is rectangular in vertical cross section. The wafer is characterized by a structure in which 100 of the trenches are continuously arranged. The coated wafer was subjected to first prebaking at 150° C. for 3 minutes. Thereafter, it was cured under a steam atmosphere of 350° C. in a burning furnace (VF 1000LP, manufactured by Koyo Thermo Systems Co., Ltd.) for 120 minutes and subsequently under a nitrogen atmosphere of 850° C. Then, polishing was performed to the uppermost surface of the trench by chemical mechanical polishing (CMP), and the surplus film on the substrate was removed. Subsequently, with respect to the obtained substrate having trenches, the nitrogen atom concentration in the trench was analyzed by secondary ion mass spectrometry (SIMS). It can be determined as satisfactory if the nitrogen atom concentration is constant in the depth direction and $1\times10^{20}$ atom/cm$^3$ or less. When the nitrogen concentration exceeds this range, the nitrogen atom concentration in the film becomes not constant, which is not preferable. The nitrogen atom concentration in each Example was $1\times10^{20}$ atoms/cm$^3$ or less. On the other hand, the nitrogen atom concentration in each Comparative Example exceeded $1\times10^{20}$ atoms/cm$^3$.

From these results, it can be observed that in the siliceous film in the trench, which was produced from the composition comprising the siloxazane compound according to the present invention, the nitrogen atom concentration hardly varies in the depth direction. But in the siliceous film produced from the composition comprising the polysilazane compound, the concentration of nitrogen atom increases depending on the depth. This indicates that when the siloxazane compound according to the present invention is used, the curing time for oxidation to produce a uniform siliceous film can be shortened.

The invention claimed is:

1. A siloxazane compound having repeating units represented by the following general formulae (I) and (II)

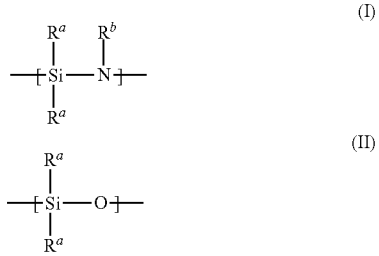

wherein $R^a$ and $R^b$ each independently represent a hydrogen atom, an alkyl group, an alkenyl group, a cycloalkyl group, or an aryl group, provided that at least one of the two $R^a$ bonded to one Si atom is a hydrogen atom, in the siloxazane compound, the ratio of the number of O atoms to the total number of O atoms and N atoms is 5% or more and 25% or less, and in the spectrum of the siloxazane compound obtained by $^{29}$Si-NMR in accordance with the inverse gate decoupling method, the ratio of the area of the peak detected in −75 ppm to −90 ppm to the area of the peak detected in −25 ppm to −55 ppm is 4.0% or less.

2. The compound according to claim 1, wherein the mass average molecular weight of the siloxazane compound is 1,500 or more and 52,000 or less.

3. The compound according to claim 2, wherein $R^a$ and $R^b$ are hydrogen atoms.

4. A method for producing the compound according to claim 3, which comprises reacting a perhydropolysilazane with water in the presence of an amine.

5. The method for producing the compound according to claim 4, wherein the amine is pyridine.

6. A composition comprising the compound according to claim 3 and a solvent.

7. The composition according to claim 6, wherein the solvent is selected from the group consisting of (a) aromatic compounds, (b) saturated hydrocarbon compounds, (c) unsaturated hydrocarbons, (d) ethers, (e) esters, and (f) ketones.

8. A method for producing the compound according to claim 1, which comprises reacting a perhydropolysilazane with water in the presence of an amine.

9. The method for producing the compound according to claim 8, wherein the amine is pyridine.

10. A composition comprising the compound according to claim 1 and a solvent.

11. The composition according to claim 10, wherein the solvent is selected from the group consisting of (a) aromatic compounds, (b) saturated hydrocarbon compounds, (c) unsaturated hydrocarbons, (d) ethers, (e) esters, and (0 ketones.

12. A method for producing a siliceous film, which comprises coating the composition according to claim 11 on a substrate and heating it.

13. The method for producing a siliceous film according to claim 12, wherein the heating is performed in a steam atmosphere.

14. A method for manufacturing an electronic device, which comprises coating the composition according to claim 11 on a substrate and heating it.

15. A method for producing a siliceous film, which comprises coating the composition according to claim 10 on a substrate and heating it.

16. The method for producing a siliceous film according to claim 15, wherein the heating is performed in a steam atmosphere.

17. A method for manufacturing an electronic device, which comprises coating the composition according to claim 10 on a substrate and heating it.

* * * * *